(12) United States Patent
Borras et al.

(10) Patent No.: US 11,902,855 B2
(45) Date of Patent: *Feb. 13, 2024

(54) DYNAMIC GEOFENCE TO PRESERVE PRIVACY AND BATTERY LIFE

(71) Applicant: GEOTOLL, INC., Plantation, FL (US)

(72) Inventors: Jaime Andres Borras, Miramar, FL (US); Wyatt Drake Geist, Davie, FL (US)

(73) Assignee: GEOTOLL, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,095

(22) Filed: Feb. 8, 2022

(65) Prior Publication Data

US 2022/0159411 A1 May 19, 2022

Related U.S. Application Data

(63) Continuation-in-part of application No. 17/087,355, filed on Nov. 2, 2020, now Pat. No. 11,246,006.

(60) Provisional application No. 62/928,819, filed on Oct. 31, 2019.

(51) Int. Cl.
| | |
|---|---|
| *H04W 4/021* | (2018.01) |
| *H04W 4/029* | (2018.01) |
| *H04W 12/06* | (2021.01) |
| *H04W 12/63* | (2021.01) |

(Continued)

(52) U.S. Cl.
CPC ........... *H04W 4/022* (2013.01); *H04W 4/021* (2013.01); *H04W 4/027* (2013.01); *H04W 4/029* (2018.02); *H04W 12/06* (2013.01); *H04W 12/63* (2021.01); *H04W 12/64* (2021.01); *G06Q 2240/00* (2013.01)

(58) Field of Classification Search
CPC ....... H04W 4/02; H04W 4/021; H04W 4/022; H04W 4/027; H04W 4/029; H04W 12/06; H04W 12/63; H04W 12/64; G06Q 2240/00; Y02D 30/70
See application file for complete search history.

(56) References Cited

U.S. PATENT DOCUMENTS

| | | | |
|---|---|---|---|
| 2012/0040697 A1* | 2/2012 | Park | H04W 64/00 455/457 |
| 2015/0154578 A1* | 6/2015 | Aggarwal | G06Q 20/145 705/13 |

(Continued)

*Primary Examiner* — Nam T Huynh
(74) *Attorney, Agent, or Firm* — The Concept Law Group, PA.; Scott M. Garrett; Scott D. Smiley

(57) ABSTRACT

A mobile device periodically determines its location and compares its location to a set of user-authorized geofenced region definitions. The proximity to any of the geofenced regions, as determines how often the mobile device determines its location (location sampling), and how it handles location information. Initially, when the mobile device is well outside of any of the geofenced regions a low location sampling rate is used. When the mobile device is within any of the geofenced regions, location information is transmitted, generally, to a backend server over a network. When the mobile device is not within any of the geofenced regions, transmission of location information can be inhibited. Further, when the mobile device is within a threshold distance of one of the geofenced regions, the sampling rate can be increased.

9 Claims, 13 Drawing Sheets

(51) Int. Cl.
*H04W 4/02* (2018.01)
*H04W 12/64* (2021.01)

(56) References Cited

U.S. PATENT DOCUMENTS

| | | | |
|---|---|---|---|
| 2016/0203651 A1* | 7/2016 | Heath | H04W 4/40 |
| | | | 705/13 |
| 2017/0140293 A1* | 5/2017 | Vij | G06F 16/29 |
| 2018/0139573 A1* | 5/2018 | Anderson | H04W 4/021 |
| 2019/0193682 A1* | 6/2019 | Santiano | G08G 1/207 |
| 2020/0302424 A1* | 9/2020 | Centner | H04W 52/0203 |

* cited by examiner

DYNAMIC GEOFENCE TO PRESERVE PRIVACY AND BATTERY LIFE

CROSS REFERENCE

This application is a continuation in part of U.S. application Ser. No. 17/087,355, filed Nov. 2, 2020, now U.S. Pat. No. 11,246,006, and was a non-provisional application claiming priority to U.S. provisional application No. 62/928,819, filed Oct. 31, 2019, the entireties of each of which are hereby incorporated by reference.

FIELD OF THE INVENTION

The present invention relates generally to tolling and navigation systems based on geo-location being detected at a mobile device, and more particularly to defining geofenced objects or locations that a user can optionally identify for inclusion in navigation operations of the user in order to protect the user's privacy in location tracking.

BACKGROUND OF THE INVENTION

Mobile devices have become ubiquitous and are used and depended on by many people throughout the world. The design of the mobile device has evolved far beyond a mobile telephone device, and are more of a handheld mobile computing device that use an operating system and which can load, install, and run application programs that access to the various features and services of the mobile device through the operating system. Many application programs send data to the manufacturer and/or third parties, raising privacy concerns. In particular, one service commonly provided by mobile devices is location service, which indicates where the device (and by implication, the user) is located at a given time. Location of the device is typically determined using common satellite positioning. An application program operating on a mobile device can request a present location reading, and the other software of the mobile device will control the satellite positioning receiver to produce a location fix and produce present location data. Operating the satellite receiver of course uses battery power. An application program can request location data at any time, as often as the location data can be produced by the satellite receiver. The privacy of location data has become a significant concern in recent times.

In response, the manufacturers of mobile devices have added privacy protection features related to location tracking to give users some control over their location data, who gets location data, and how it can be used. These new features have an impact on third-party application programs that use location services, and therefore have to access location information through the operating system of the device. At its annual Worldwide Developer Conference on Jun. 4, 2019, Apple announced a number of new privacy features to give users an alternative to the way data-driven advertising companies like Facebook, Google and hundreds of ad-tech providers are allowed to receive location information. One way location information is being limited is through user prompts when a third party application program requests location information. Conventionally, users are asked to allow access to location information once, when the application program is first installed and run, and thereafter the application program would always have access to the location information.

In response manufacturers and operating system developers have implement additional controls over location information. For example, Google has implemented ways to hide personal activity from Google, giving customers greater control over their privacy when using Google Maps, YouTube, and Google Assistant. One way of reducing location exposure is by providing an "incognito" mode for Maps. Another example is providing an "auto-delete" option for YouTube history. Google has also implemented an option to erase recent voice commands and questions users issue to their version of Google Assistant without having to open an application on the mobile device. Turning on incognito mode in Maps stops information about the places a user searches for and visits being saved to their Google account. Google previously saved this data to personalize your Maps experience. The Maps application, as well as other Google apps and third party apps, collect both personalized and anonymized data about users, ostensibly to improve these services. Accordingly, privacy has become an important concern for tech companies.

Furthermore, as is always a concern with mobile devices, which are battery powered, the periodic background transmission of information to backend service entities by application programs adds to the battery load, depleting battery charge. Transmitting location information is no different, and conventional approaches to location tracking likewise add to the load on the battery even when the mobile device is not in active use by the user.

Therefore, a need exists to overcome the problems with the prior art as discussed above.

SUMMARY OF THE INVENTIVE DISCLOSURE

In accordance with some embodiments of the inventive disclosure, there is a provided a mobile device having a processor and a non-volatile storage coupled to the processor. The non-volatile storage includes instruction code that, upon execution by the processor, causes the mobile device to generate a set of user-authorized geofenced region definitions and storing the set of user authorized geofenced region definitions in the mobile device. To generate the set of user-authorized geofenced region definitions, the instruction code further causes the mobile device to receive a base set of geofenced region definitions over a network from a backend server, prompt a user of the mobile to indicate whether the user wants to opt-in to an expanded set of geofenced region definitions, and receive the expanded set of geofenced region definitions over the network from the backend server, including the expanded set of geofenced region definitions with the of geofenced region definitions in the set of user-authorized geofence definitions. The instruction code further causes the mobile device to determine its present location periodically at a base location sampling rate and compare the present location with the set of user-authorized geofenced region definitions. The instruction code further causes the mobile device to determine that the present location is within a threshold distance from at least one geofenced region corresponding to one of the geofenced region definitions in the set of user-authorized geofenced region definitions, and in response, increasing determining its present location to a high location sampling rate that is higher than the base location sampling rate.

In accordance with a further feature, the instruction code further causes the mobile device to not transmit location information while determining its present location periodically at the base location sampling rate, determine that the present location is within at least one geofenced region corresponding to one of the geofenced region definitions in the set of user-authorized geofenced region definitions, and in response, the mobile device periodically transmits the location information to a backend server over a network.

In accordance with a further feature, the instruction code further causes the mobile device to, subsequent to determining that the present location is within the at least one geofenced region, determine, based on consecutive location determinations, that the mobile device is not moving, and in response to determining that the mobile device is not moving, inhibit transmitting the location information while the mobile device is not moving.

In accordance with a further feature, the base location sampling rate and the high location sampling rate are determined in terms of distance and based on a present speed of the mobile device.

In accordance with a further feature, the base location sampling rate is adjusted so that location sampling occurs once per kilometer.

In accordance with a further feature, the high location sampling rate is adjusted such that location sampling occurs once every five meters.

In accordance with a further feature, the instruction code further causes the mobile device to determine that the present location is within at least one geofenced region corresponding to one of the geofenced region definitions in the set of user-authorized geofenced region definitions, and in response determine that the one of the geofenced region definitions includes a resource link. The instruction code further causes the mobile device to utilize the resource link to access a resource corresponding to the resource link, and notify a user of the mobile device of the resource.

In accordance with a further feature, each of the geofenced region definitions in the base set of geofenced region definitions correspond to a tolling location.

In accordance with a further feature, the instruction code further causes the mobile device to display an icon in a first graphical state when using the base location sampling rate, and display the icon in a second graphical state when using the high location sampling rate.

In accordance with some embodiments of the inventive disclosure, there is a mobile device that includes a processor and a non-volatile storage coupled to the processor. The non-volatile storage includes instruction code that, upon execution by the processor, causes the mobile device to generate a set of user-authorized geofenced region definitions and store the set of user authorized geofenced region definitions in the mobile device, periodically determine a present location of the mobile device at a base location sampling rate while displaying an icon in a first graphical state, compare the present location with the set of user-authorized geofenced region definitions, and determine that the present location is within a threshold distance from at least one geofenced region corresponding to one of the geofenced region definitions in the set of user-authorized geofenced region definitions, and in response, increase the location sampling rate to a high location sampling rate that is higher than the base location sampling rate and change the icon from the first graphical state to a second graphical state.

In accordance with a further feature, the instruction code further causes the mobile device to, while using the base location sampling rate, not transmit location information, determine that the present location is within at least one geofenced region corresponding to one of the geofenced region definitions in the set of user-authorized geofenced region definitions, and in response, periodically transmit the location information to a backend server over a network.

In accordance with a further feature, the instruction code further causes the mobile device to, subsequent to determination that the present location is within the at least one geofenced region, determine, based on consecutive location determinations, that the mobile device is not moving, and inhibit transmitting the location information while the mobile device is not moving.

In accordance with a further feature, the instruction code causes the mobile device to determine the base location sampling rate and the high location sampling rate in terms of distance, based on a present speed of the mobile device.

In accordance with a further feature, the base location sampling rate adjusted so that location sampling occurs once per kilometer, and the high location sampling rate is adjusted such that location sampling occurs once every five meters.

Although the invention is illustrated and described herein as embodied in a dynamic geofence system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
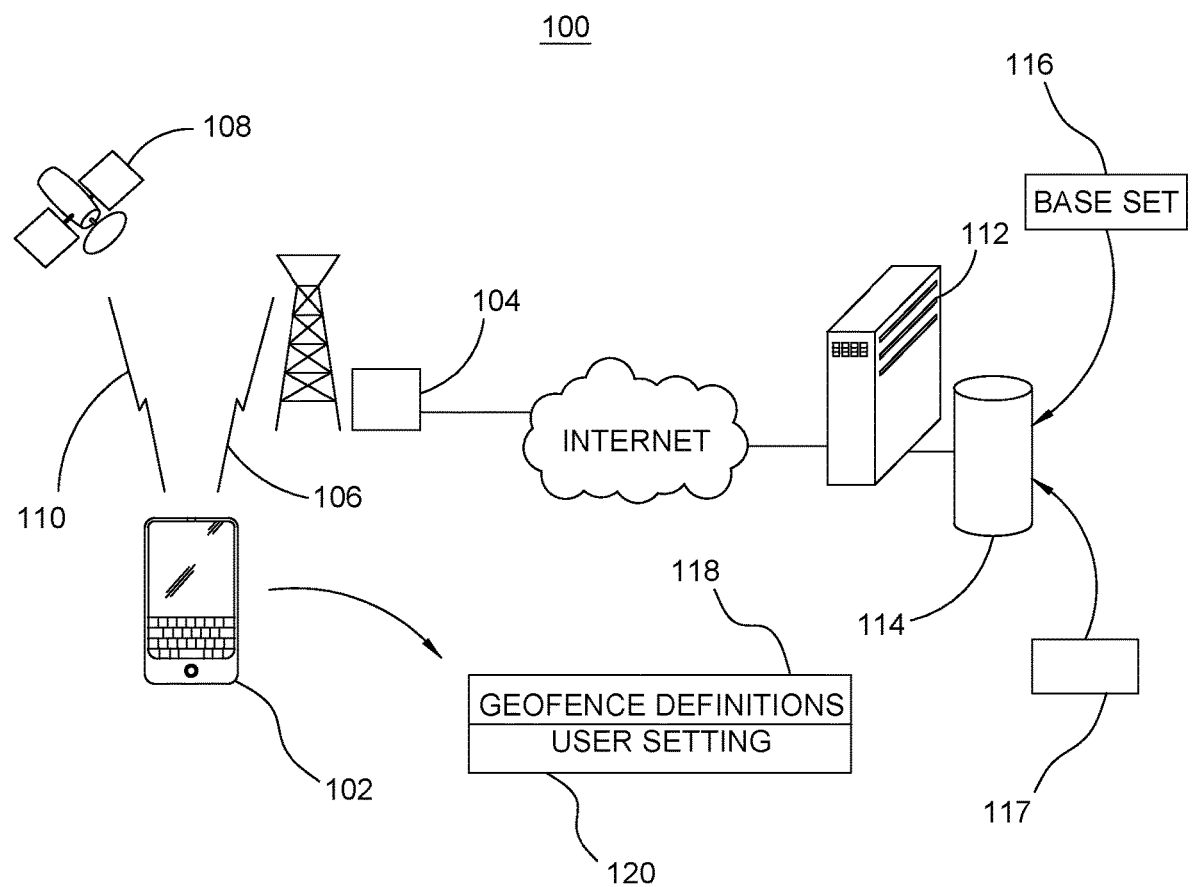
FIG. 1 is a system diagram of a system including a mobile device that selectively collects and transmits location data to a backend server based on a location privacy selection at the mobile device, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Embodiments of the inventive disclosure provide a technology that allows a user to control certain location tracking privacy choices related to an application program on their mobile device. The protected location privacy further solves the continuous GPS tracking problem feared by the users when they download a GPS/location-based tolling application program to their mobile device, or any GPS tracking app. One aspect that is unique is the method used to only keep the GPS coordinates of the users in locations that they have authorized, such as toll plazas for tolling, or opt-in to get toll discounts, based on the user agreeing to receive advertising. The inventive concept defines a dynamic geofence that expands or contracts selectively depending on the user's authorized locations for peace of mind while enabling some useful experiences. That is, the user is given control over defining what regions, areas, or locations can be tracked by the mobile device or backend associated with the application program. In the case of a tolling application program, where location is used to identify that the user has passed through a tolling location, it is important that the backend system maintain a record of the event in the form of information received from the user's mobile device, in order to verify and authorize transactions. As such, geofenced locales defining tolling locations are included automatically, and agreed to by the user during registration.

This unique concept combined with a high accuracy geofence location algorithm may also be used in other industries where location privacy is a concern. Among benefits that can be provided to the user is, for example, assessing that a user is near a pharmacy and prompting them with a reminder message to pick up medication, or when visiting a medical care provider, automatically retrieving any forms or information provided by the medical care provider to save time. The inventive technology has uses in a wide variety of applications related to travel.

Presently, mobile devices typically allow users to provide coarse control over location tracking by allowing or disallowing whether a given application program ("app") can have access to location information. It is either "all or nothing" type of selection. However, an app may need to have access the user's location to perform its function. If the user does not allow access to the location information then the app will not work, or will not work properly. Some mobile devices have an extra level of privacy protection where the user can choose a setting that give the app access to location information only while the user is actively using the app, which inhibits the app from accessing location information when it is in a background state.

In addition, some mobile devices provide more privacy control to its users by, for example, during installation, the location setting is set automatically to an "Ask Next Time" setting; when the user attempts to open the app for the first time, it asks, for example "the app would like to send you notifications," and the choices can be "Don't Allow"/"Allow," and the user must select Allow in order activate the option. When the user attempts to activate the app for the first time, the operating system asks "Allow the app to access your location?" with the following choices "Allow while using this app/Allow once/Don't Allow," and the user must select "Allow while using this App"; then it asks "Allow the app to also access your location even when you are not using the app?" with the following choices "Keep Only While Using/Change To Always Allow," obviously, for the app to work all of the time the user must chose "Always Allow" potentially raising tracking concerns.

The inventive system of this disclosure addresses these tracking concerns by asking the user, upon installation of the app, whether they want to "opt-in to get toll discounts by allowing advertisements and promotions" with the choices of "Yes" or "No." If the user selects "No", then the app selects a very localized geofence set needed to operate the app, which includes geofenced regions that are defined, as close as possible, to the toll highway (a few feet from the cumulative set of toll plazas) to prevent tracking users outside of toll plazas, but capturing and storing location information for each toll transaction. The geofenced regions excludes, for example, nearby buildings and other places that are not necessary for tolling activity. Toll points are therefore included in the geofenced region. Or rather, the geofenced region is defined around the toll points to the exclusion of any non-selected regions. However, if the user agrees to a wider location access, then a wider set of geofenced regions are included in the user's set of authorized geofenced regions to provide relevant advertisements and promotions to the user. Further, the user designate custom regions of their choosing to be included in their particular set of authorized geofenced regions.

FIG. 1 is a system diagram of a system 100 including a mobile device 102 that selectively collects and transmits location data to a backend server 112 based on a location privacy selection at the mobile device 102, in accordance with some embodiments. The mobile device 102 is a computing device including sub-systems for wireless radio communication using a variety of radio interfaces. Accordingly, the mobile device 102 includes one or more processors, memory, and other computing resources, as is well known. Mobile device 102 can communicate with a mobile communications infrastructure such as a cellular communication station 104, using signals 106 over a defined air interface. The cellular communication station 104 can be connected to a wide area public network such as the Internet in order for the mobile device to communicate with the backend server 112. Other modes of network communication can be used equivalently. The mobile device 102 can also receive satellite location signals 110 from locate satellites 108 in orbit around the Earth, as is well known. Typically signals from 3-4 satellites are necessary in order to determine a location "fix" that maps the mobile device's position to a set of global coordinates. Alternative means of determining location can also be used, such as, for example, determining to location of a WiFi access point to which the mobile device is connected using a wireless local area network interface, triangulating among signals received from several cellular communication stations, and so on. However, satellite location typically provides the highest resolution of location accuracy.

Upon loading and installing the app, the app can initially communicate with the backend server 112 to retrieve a base set of geofenced region (GFR) definitions 116 that can be maintained in a data store 114 that is operably connected to the backend server 112. The base set of geofenced regions 116 include only the minimum geofenced regions for the app to operate properly on the mobile device 102. The database 114 can further include a set of additional, optional geofenced region definitions 117 that can be used for advertising purposes, in order to allow the user to get a discount on toll transactions. The app can give the user the option to include the optional geofenced region definitions 117, and if the user agrees, then they will also be transmitted and loaded into the mobile device 102. The app can also allow the user to select or define custom geofenced regions for places that are of particular interest to the user, such as a doctor's office, a pharmacy, a workplace, a school, etc. These identified locations can be further tied to other services, as will be discussed. Accordingly, the mobile device 102 will contain a user-authorized set of geofence definitions or regions 118 along with the user settings 120. The geofence definitions 118 will include the base set of definitions 116, and the optional set 117 if authorized by the user, as well as any custom user defined geofenced region definitions.

Figure 2:
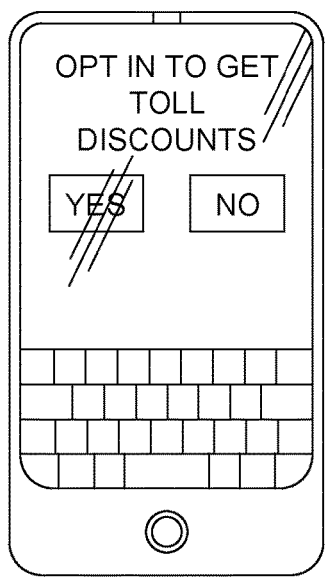
FIG. 2 shows an exemplary graphical user interface screen on a mobile device prompting a user to decide whether to opt in to a discount program based on location, in which a pre-selected set of additional geofenced regions will be added to the user's authorized geofenced regions, in accordance with some embodiments.

FIG. 2 shows an exemplary graphical user interface screen 200 on a mobile device prompting a user to decide whether to opt in to a discount program based on location, in which a pre-selected set of additional geofenced regions (e.g. 117) will be added to the user's authorized geofenced regions, in accordance with some embodiments. If the user does not accept the option, then only the base set of definitions (e.g. 116) will be transmitted to the user. These definitions can be periodically updated.

Figure 3A:
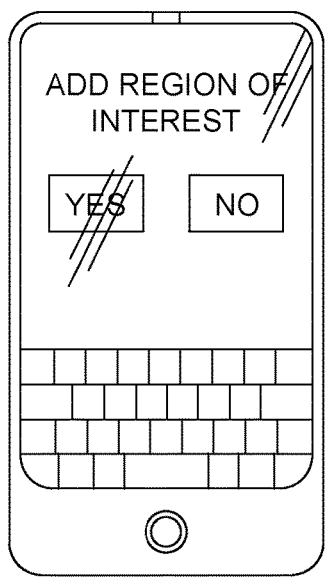
FIG. 3A shows an exemplary graphical user interface screen on a mobile device prompting a user to decide whether to add user-defined geofenced regions of their own selection to be added to the user's authorized geofenced regions, in accordance with some embodiments.
Figure 3B:
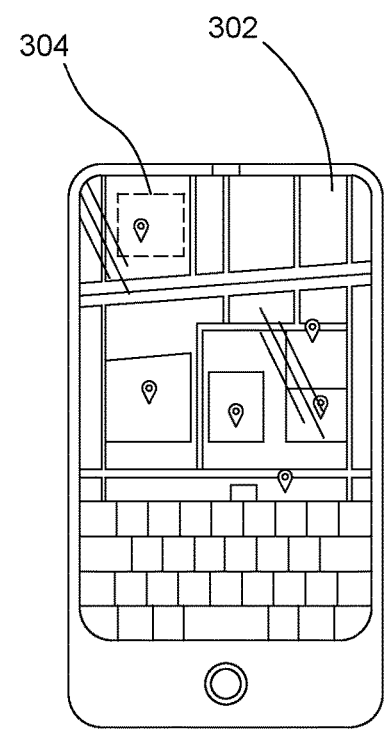
FIG. 3B shows an exemplary graphical user interface screen on a mobile device of a map interface that allows a user to draw or otherwise select regions on a map that are to be added to the user's authorized geofenced regions, in accordance with some embodiments.

FIG. 3A shows an exemplary graphical user interface screen 300 on a mobile device prompting a user to decide whether to add user-defined geofenced regions of their own selection to be added to the user's authorized geofenced regions, in accordance with some embodiments. If the user decides to include additional regions (such as by selecting "yes"), then the app can bring up a map interface 302 as shown in FIG. 3B, such as by an API to a map program or a custom map maintained at the server 112. Upon displaying the map interface 302, the user and navigate the map interface to a region of interest. The map interface can capture input, such as allowing a user to "draw" a shape around a region 304, indicating the path drawn by the user with a dashed line or equivalent indicia. The map interface 302 can also allow the user to place shapes and resize/orient them on the map to cover a region. Once the user select a region, the map interface creates a geofence definition corresponding to the selected region, and adds the geofence definition to the user's set of user-authorized geofence regions (e.g. 118).

Figure 4:
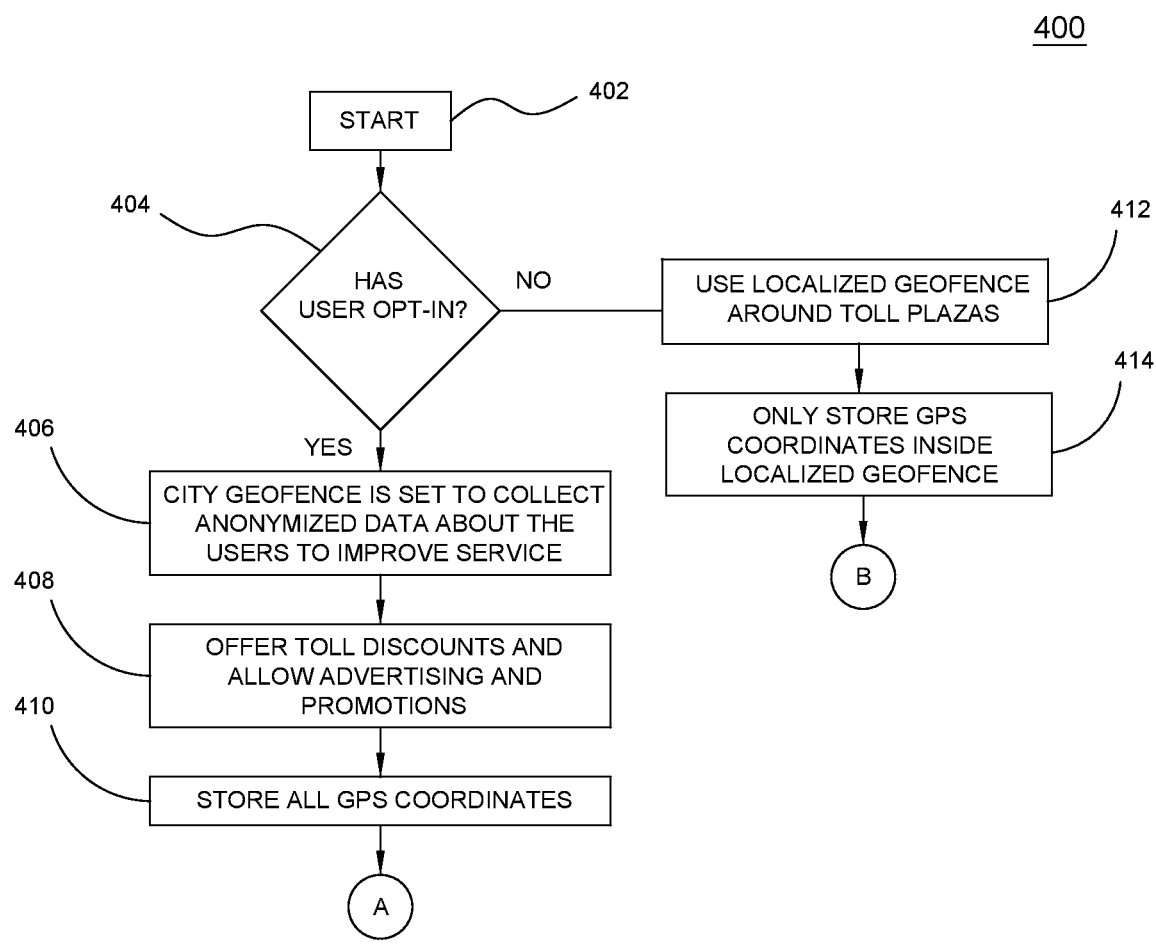
FIG. 4 is a flow chart diagram of a method for initializing an application usage and user opt in/out selection, in accordance with some embodiments.

FIG. 4 is a flow chart diagram of a method 400 for initializing an application (app) usage and user opt in/out selection, in accordance with some embodiments. The app is a tolling app that allows users to use their mobile device to conduct toll transactions, and to optionally allow for other location-based services. Thus, in method 400, the user inputs their selection as to whether they would like to participate in optional services, which further dictates how location information produced by the mobile device is handled and maintained in private. At the start 402 the user has loaded and installed the app onto their mobile device and has launched or started the app, or accessed user settings for optional location-based services. In step 404 the app prompts the user at a graphical user interface to select whether the user wants to participate in expanded location services or use the app only for tolling services. If the user indicates in step 404 that the user does not want to participate in optional location-based services, then the method 400 proceeds to step 412 where the mobile device fetches or loads only the geofenced region definitions for toll plaza and other tolling locations. Further, the app will set location reporting in step 414 such that location information is only stored when the mobile device is located in the base set of geofenced locations corresponding to those in the base definition set loaded in step 412.

If, in step 404, the user indicates they want to participate in additional services, then in step 406 the base set of geofenced region definitions for tolling is included with a wider set of geofence region definitions including, for example, municipalities, non-toll roadways, and so on. These additional geofenced region definitions allow the app to report location information when the mobile device is within any of the defined base or additional geofenced regions. The location information is reported without personal information, and can be limited only to geo-coordinates. As used here, "personal information" refers to information that can be used to identify the user that is additional to coordinates, such as a phone number, a device identifier, an email address, or any other such information that is added by the operating system or that is otherwise returned to the app upon requesting location information from the operating system, API, or location subsystem. Further, in step 408, the user can be prompted to participate in an advertising program that will provide discounts for tolling. Businesses can pay to have the tolling service push advertising to the mobile device that will be displayed by the app when the mobile device is within a certain geographic range of the business, or when it is determined, through location history, that the user is frequently in the area of the business. As a result of opting in to the additional location services, and/or advertising, in step 410 the app will set the location information handling to store all location coordinate information and report the location information (e.g. to server 112 or similar). After performing step 410 the method 400 can pass off to method 600 of FIG. 6, and after performing step 414 the method 400 can pass off to method 700 of FIG. 7. However, in some embodiments, after performing method 400 and ending at either step 410 or 414, method 500 of FIG. 5 can optionally be performed.

Figure 5:
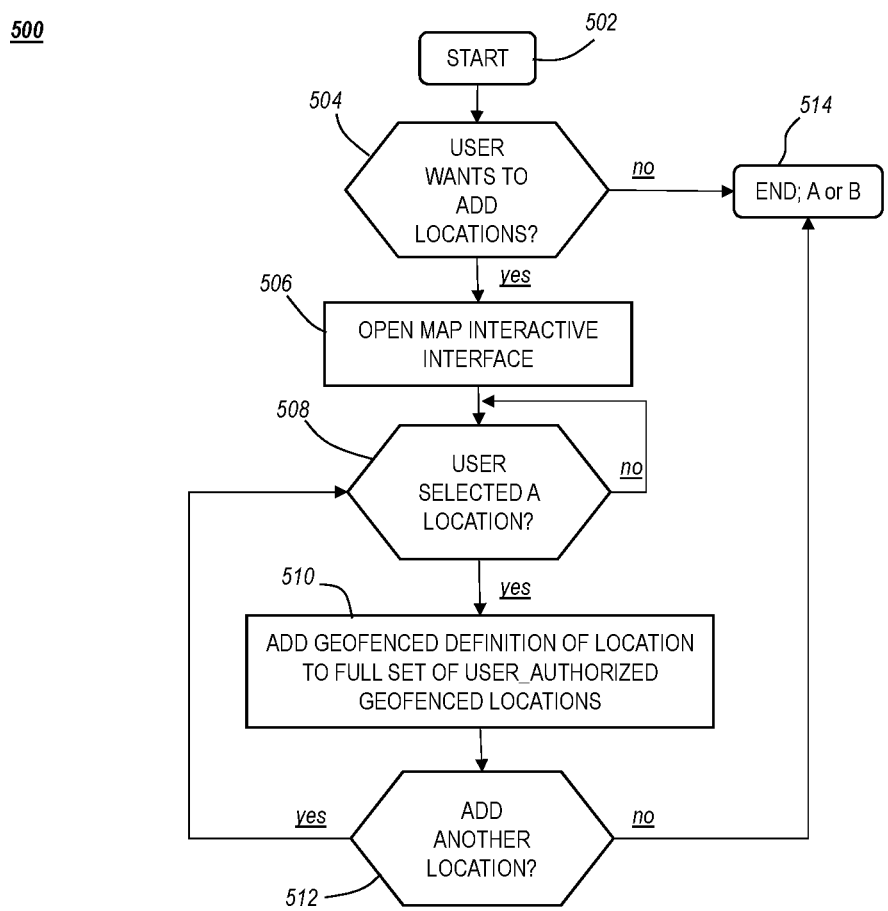
FIG. 5 is a flow chart diagram of a method for a user to add user-defined geofenced regions to the user's authorized geofenced regions, in accordance with some embodiments.

FIG. 5 is a flow chart diagram of a method 500 for a user to add user-defined geofenced regions to the user's authorized geofenced regions, in accordance with some embodiments. At the start 502 the user has either initialized the tolling app or has accessed user settings to open a graphical user interface where, in step 504, the user is prompted or provided with an option to add user-defined regions to the user's full authorized set of geofenced regions. If the user decides not to add any regions, then the method ends at step 514 and proceeds as determined in method 400. If the user does want to add regions, then in step 506 a map interface can be opened (e.g. as in FIG. 3B) that allows a user to navigate on a map and select or designate one or more regions. In step 508 the method determines if the user has selected and finalized a region. In step 510, after the user has selected a region on the map a geofence definition is created for the selected region and added to the full set of user-authorized geofenced locations at the mobile device. It should be noted that any user-selected regions are not shared by the mobile device, and are only used by the app on the mobile device. In step 512 the app can prompt the user if the user wishes to add another region, and then either proceed to step 508 or to end at step 514. As a result of performing method 500, the app, executing on the mobile device, the user can add regions of interest for which the user may desire other services.

It is further contemplated that the server (e.g. 112) may have a set of geofence region definitions that correspond to locations of interest, such as businesses. These locations can be displayed on the map interface when the user brings up the map interface in step 506 to allow a user to select then directly. Alternatively, when the user selects a region in step 508, the app can retrieve any defined geofence regions in that larger selected region. Thus, a smaller geofenced region can be nested inside a larger region selected by the user. Further, it is contemplated that the geofence definitions for such pre-defined regions can include associated hyperlinks to network-connected resources of those business entities. These hyperlinks can be passed to a third party app on the mobile device upon the mobile device entering the geofenced region, or to a browser on the mobile device. Such hyperlinks can direct the user to a webpage for the business, or other uniform resource locator (URL) used by computing equipment of the business. In some embodiments it is further contemplated the user can select a region and associate another app on the mobile device with the region, such as a "to do" list app to remind a user when they are in the geofenced region. Numerous other applications will occur to those skilled in the art. It is further contemplated that tolling locations can use the same format; a hyperlink for a toll agency can be associated with definitions of tolling location geofences such that, upon entering a geofenced region associated with the tolling location, a tolling transaction can be triggered.

Figure 6:
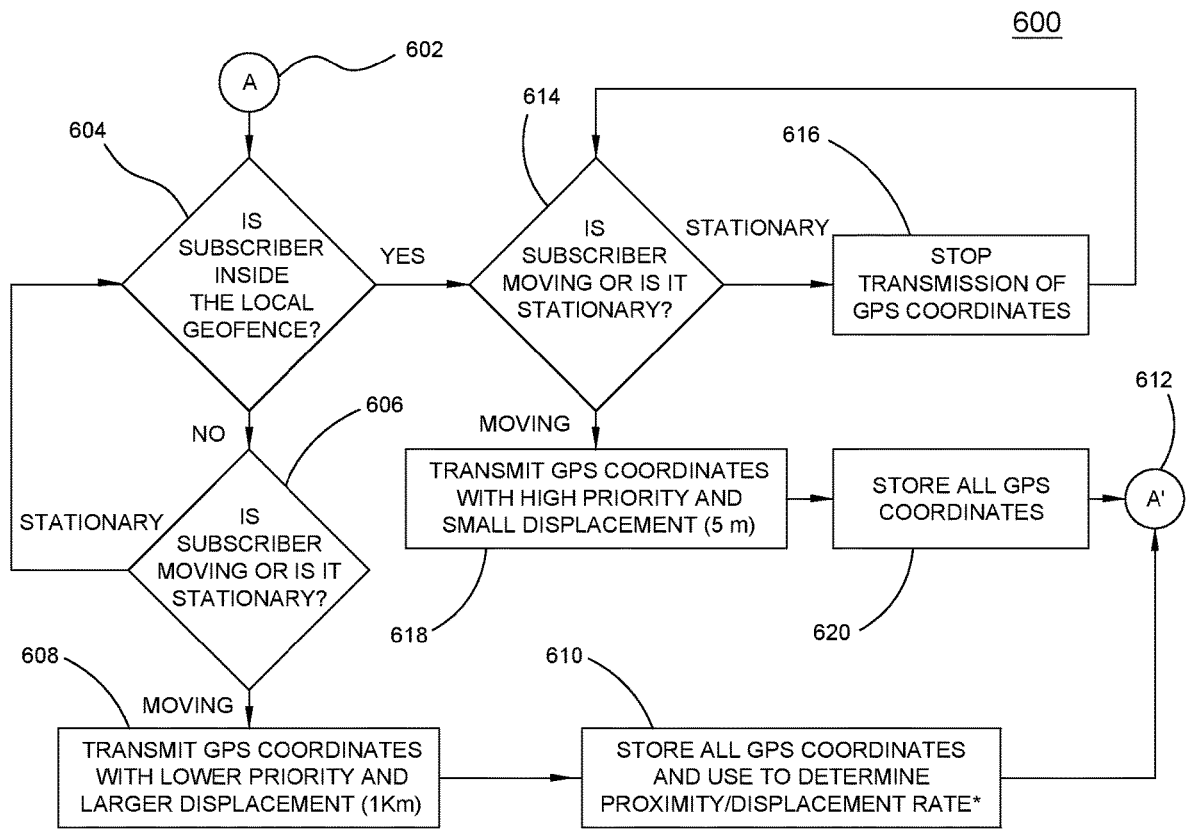
FIG. 6 is a flow chart diagram of a method for handling location information for a user that has opted in to location sharing in exchange for toll discounts, in accordance with some embodiments.

FIG. 6 is a flow chart diagram of a method 600 for handling location information for a user that has opted in to location sharing in exchange for toll discounts, in accordance with some embodiments. Method 600 is entered into from method 400 after performing steps 406, 408, 410. Method 600 can occur in conjunction with toll activity as the mobile device moves, during which time the app periodically, at a specified period access present location information, such as by a location satellite receiver of the mobile device, through the operating system of the mobile device. At "A" 602, the method 600 has been entered from either method 400 or method 500, and is generally indicative of how the tolling app operates when an expanded set of geofenced regions is selected by the user (i.e. more than the base set). Initially the app, as executed on the mobile device by the processor of the mobile device, periodically requests present location information from the operating system, or directly from the location satellite receiver. The rate at which location is checked is at a minimum rate on the assumption that the mobile device is not within any defined geofence region of the full set of user-authorized geofenced regions. In step 604 a determination is made as to whether the present location is within a defined geofence region of the set of user-authorized geofenced regions stored at the mobile device. If the present location indicates that the mobile device is not within any of the defined geofenced regions, then in step 606 the method 600 determines if the mobile device is moving (substantially) or stationary. If the mobile device is stationary, meaning no significant difference between the present location and the next most recent location, for example, then no further action is taken and the method returns to step 604 for the next location determination period. If the mobile device is moving, as indicated by a sufficient difference between the present location and the next most recent location, then in step 608 the mobile device will report its location to a server at a low priority. The location information may only include coordinates and time, and the frequency of reporting can be based on distance moved, time, or a combination of both. For example, the location reporting can occur based on the mobile device changing location every 1 kilometer. In some embodiments location reporting can occur every minute. In some embodiments, the location reporting can occur upon either a distance moved or time period first occurring. In step 610, the present coordinates are stored by the server after receiving them in step 608. This allows the server to determine the proximity of the mobile device and movement rate relative to various entities in the geofenced region that may, for example, participate in a promotional program. This allows the server to send promotional and other notification messages to the mobile device that may be relevant based on the location of the mobile device, or based on locations where the mobile device is often located. In step 612, labelled "A'" (A prime), the method simply returns to step 604 for the next location determination period.

When, in step 604, it is determined that the present location is within one of the defined geofenced regions of the set of user-authorized geofenced regions, then the method again in step 614 determines whether the mobile device is moving or stationary. If the mobile device is stationary, then in step 616 location reporting is inhibited to save battery charge. If the mobile device is moving, then in step 618 location reporting occurs at a high priority, which means at a greater frequency, or a much smaller distance than occurs in step 608. For example, location reporting can occur for every five meters moved. This means location sampling can also increase. And as indicated in step 620, all location information occurring in a geofenced region can be stored. The reported location can be used by the server to identify businesses in the geofenced region that may be participating in a promotional program. Advertising revenue paid by business can be used to subsidize toll payments of a subscriber. For example, toll charges can be reduced based on how many promotional messages they receive.

Thus, in method 600, location information such as location coordinates are only provided to another entity by the app when the mobile device is within any of the defined geofenced regions. That location information can be used by a backend server to provide promotional messages or notifications to the mobile device. The location information can be genericized such that personal or other identifying information is not linked (e.g. email address, phone number, device identifier, etc.). Further, by defining geofenced regions that indicate the only regions in which location information is allowed to be transmitted by the app, using the app results in less power usage over time compared to the typical app configuration where location information is transmitted without regard to the location of the mobile device.

Figure 7:
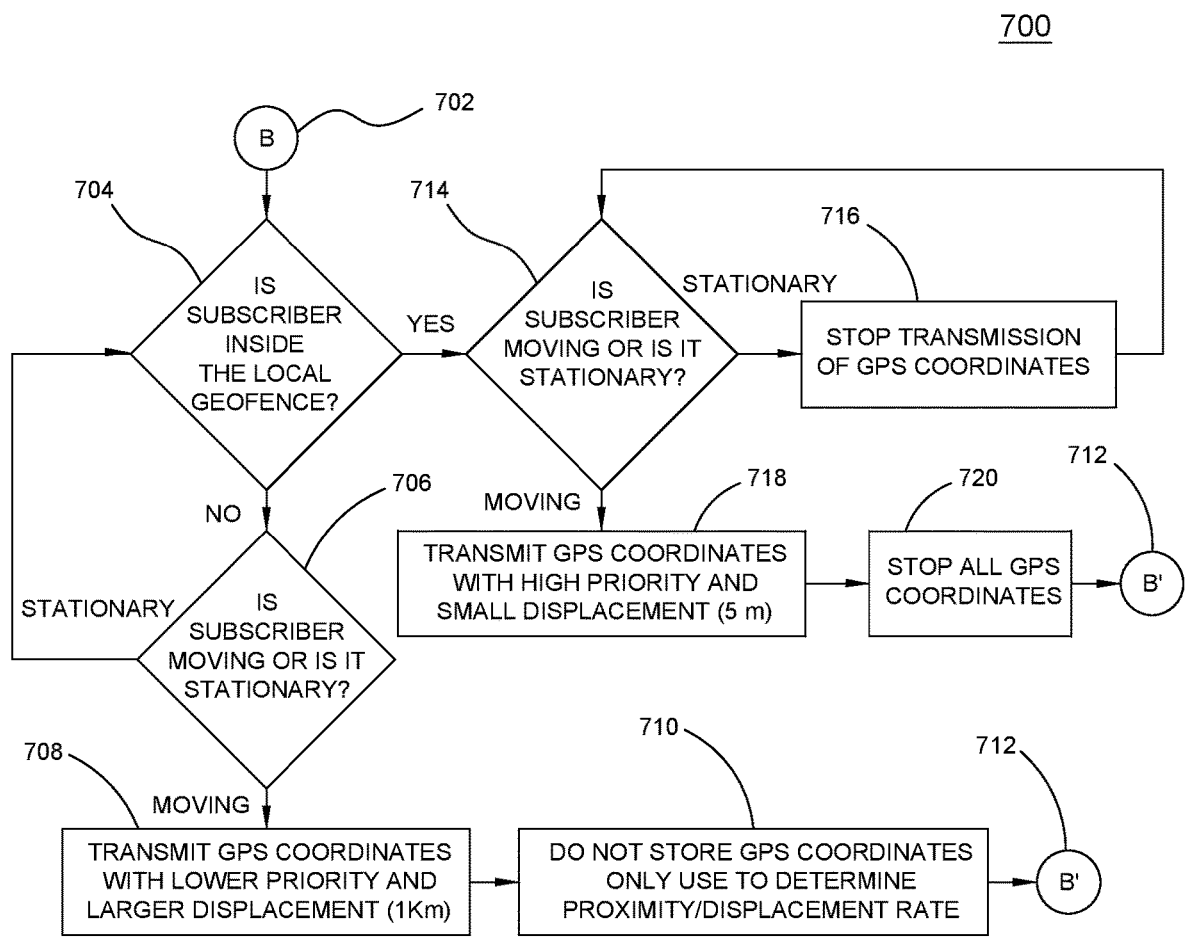
FIG. 7 is a flow chart diagram of a method for handling location information for a user that limited location data usage, in accordance with some embodiments.

FIG. 7 is a flow chart diagram of a method 700 for handling location information for a user that limited location data usage, in accordance with some embodiments. Method 700 is entered from methods 400 or 500 when the user has set the app to use only the essential geofenced regions. For a tolling app, that means tolling locations, which can be physical toll plazas as well as virtual toll points along roadways, and can include both general tollways as well as optional express lanes along otherwise non-toll roadways. The method 700 is similar to method 600 with the difference of step 710 over step 610 in which location coordinates are not stored at the server and are only used for toll transaction tracking. Thus in step 704 it is determined whether the mobile device is within a geofenced region, and in method 700 only the base set of geofenced regions are used. Thus, when the mobile device is within a geofenced region of the geofenced definitions in the mobile device, it means the mobile device is proximate to tolling location. In both steps 706 and 714 the mobile device determines whether the mobile device is moving or stationary. When the mobile device is moving but not in a defined geofenced region, in steps 708 and 710 the mobile device will transmit location information at a low rate in either time or distance travelled, or either, but as indicated in step 710 the server does not store the location information and it is only used for determining whether the mobile device is approaching a defined geofenced region and at what rate by the mobile device. After step 710 the method returns from B' to B for the next periodic iteration. In some embodiments, when the mobile device is moving but not in a defined geofenced region, in steps 708 and 710 the mobile device will not transmit any location information to save battery life; in this embodiment, the location information is only transmitted and stored inside the local tolling geofence.

When, the determined location in step 704 is within a defined geofenced region, and, as determined in step 714 the mobile device is moving, then the mobile device transmits location information at a higher rate than in step 708 (e.g. every 5 meters instead of every kilometer), and location information is stored in step 720. While not shown, it should be understood that in the branch of them method 700 represented by steps 704, 714, 718, 720 the mobile device will pass a tolling location and the tolling app will conduct a toll transaction, which involves transmitting transaction information to a toll agency backend server, and the transaction information will include location information (coordinates and time) that can be used to verify the toll transaction for payment of the toll charge.

Figure 8:
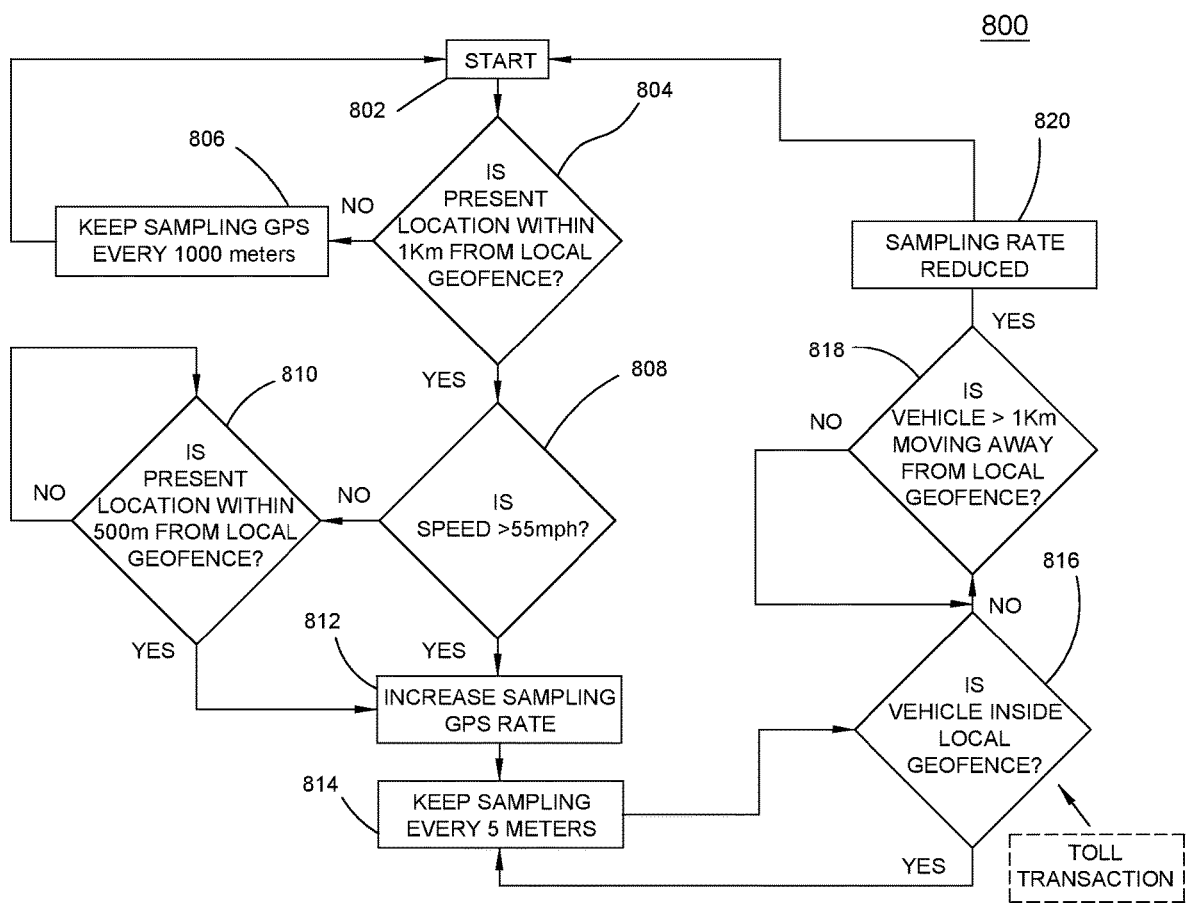
FIG. 8 is a flow chart diagram of a method for adjusting the rate of location sampling based on proximity to a qualified geofenced location, in accordance with some embodiments.

FIG. 8 is a flow chart diagram of a method 800 for adjusting the rate of location sampling based on proximity to a qualified geofenced location, in accordance with some embodiments. Method 800 adjusts the rate of location sampling by the app when executed on the mobile device and is used in conjunction with either method 600 or method 700, depending on which one is selected by the user of the mobile device. The location sampling is performed by accessing a location API of the operating system, or by providing a call to a location subsystem of the mobile device such as a location satellite receiver or other subsystem that can determine location of the mobile device. In response to the call by the app, the app will receive location information from the location subsystem. Location sampling rate is adjusted based on the proximity to a defined geofenced location of the set of user authorized geofence locations used by the mobile device as a result of the user's choice to use the basic set of geofenced location definitions, or an expanded set. Thus, the sampling rate is dynamic. At the start 802, it may be assumed that the mobile device's present location is unknown, despite possibly having already performed one or more iterations of method 800. The location sampling rate may be undetermined or already set by having performed method 800 one or more times. Thus, in step 802, the app, as executed by a processor of the mobile device, retrieves present location information and evaluated the location information first in step 804. In step 804 the present location information (e.g. global coordinates) is compared to the geofenced region definitions in the set of user authorized geofenced region definitions used by the mobile device, and selected by the user. If, as a result of the comparison in step 804, the present location indicates that the mobile device is presently more than a threshold distance (e.g. 1 Km) away from any geofenced region of the set of user authorized geofenced regions, then the location sampling rate is set to, or kept at, the lowest location sampling rate in step 806, which can be time or distance based. When using a distance-based sampling rate, a speed of the mobile device can be determined and used to infer how long it will take for the mobile device to move a given distance.

In step 804, when the present location of the mobile device is within the threshold distance, then in step 808 a speed determination can be evaluated. If the speed of the mobile device, as indicated by successive locations relative to time, is under a threshold speed, then the method 800 proceeds to step 810 and waits until the present location is within a second, closer distance threshold of a defined geofenced region. The waiting loop of step 810 can be performed by the determining difference between the most recent location of the mobile device relative to a geofenced region, and the speed of the device, to infer when the mobile device will be within the second threshold distance.

If, in step 808 the speed is over the threshold speed, or when, in step 810 the mobile device is within the second threshold distance, the method 800 proceeds to step 812 in which the sampling rate is greatly increased (e.g. from 1 Km to 5 m) in step 814. Step 814 is maintained while the conditions of either step 808 or 810 are met, and as indicated in step 816, when the present location is within a geofenced region of the set of user authorized geofenced regions. Once present location is within a geofenced region, then the method commences to step 818 in which the higher location sampling rate is maintained until the present location is beyond the first threshold distance of the geofenced region (and not within the first threshold distance of another geofenced region). In step 818, once the present location is more than the first threshold distance from any geofenced region of the set of user authorized geofenced regions, then the location sampling rate is reduced in step 820 to the lower location sampling rate initially used, and the method returns to the start 802. It can be assumed that, in step 816, the mobile device can pass through a tolling location, can be bounded by a smaller geofenced region inside a larger geofenced region. This, a larger geofenced region can be used to trigger the higher sampling rate so that a more precise time of passing through a geofenced tolling point can be determined. This is why to sampling rate is expressed in terms of units of distance rather than units of time. The intent is to ensure that a location sample occur within a smaller tolling point geofenced region. Thus, speed must be determined first, then based on speed, a temporal sampling rate can be determined to ensure that location samples occur every given units of distance. This is necessary because many tolling points use cameras to identify and verify vehicles passing through the tolling location, thus it is important to establish a specific time at which a vehicle (in which the mobile device is located) passed through the tolling point. In some embodiments, a granularity of five meters is sufficient.

Figure 9:
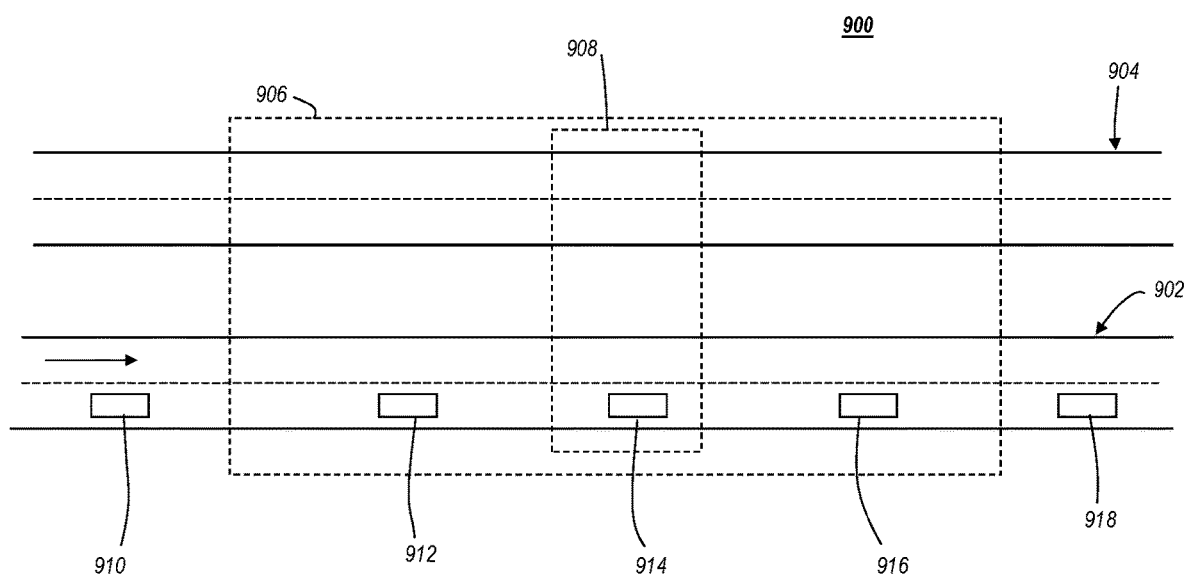
FIG. 9 is a location diagram including geofenced regions defined in the user's authorized geofenced regions, and showing the user in different locations relative to the geofenced regions to illustrate how location sampling and reporting is handled in each of the various locations, in accordance with some embodiments.

FIG. 9 is a location diagram 900 including geofenced regions defined in the user's authorized geofenced regions, and showing the user in different locations relative to the geofenced regions to illustrate how location sampling and reporting is handled in each of the various locations, in accordance with some embodiments. The example shown here can be used with either method 600 or method 700, as well as with method 800 in conjunction with either method 600 or method 700. The diagram 900 shows a roadway including two separate directions of travel on a first set of lanes 902 and a second set of lanes 904. The direction of travel in lanes 904 is the opposite of that of lanes 902. A vehicle is shown at various positions 910, 912, 914, 916, and 918 along lanes 902. Further, a set of geofenced regions 906, 908 are defined that cover regions through which the lanes 902, 904 pass. Geofenced region 908 is nested within geofenced region 906, and can represent a relatively small area corresponding to a tolling location within geofenced region 906. It will be understood that geofenced regions 906, 908 are included in a mobile device carried in the vehicle, and that the mobile device includes a tolling app and a set of user authorized geofenced regions.

When the vehicle is at position 910 the vehicle is not inside any defined geofenced region. Thus, according to method 600 and 700, assuming the vehicle is moving, the mobile device may transmit location information to the server at a low rate, or not transmitted at all. If method 600 is being followed, step 610 will apply and location information can be stored by the server. If method 700 is followed, step 710 applies and location information is not stored. Under method 800, the vehicle at position 910 may or may not be within the first distance threshold of geofenced region 906. For example, if the vehicle is more than the first distance threshold away from geofenced region 906, then a low location sampling rate is used (e.g. step 806). If the vehicle is within the first distance threshold relative to geofenced region 906, then steps 808, 810, 812, 814 can apply and a high location sampling rate is used.

At locations 912, 914, 916 the location sampling will be performed at the high rate, and as long as the vehicle is moving the location information will be transmitted at the high rate. Essentially every location sample result will be transmitted to the server. The transmission it done at a high priority, meaning lower priority data that may be being transmitted will be suspended so that the location information can be transmitted. In both methods 600 and 700 the transmitted location information will be stored at the server. The mobile device may also store some of the most recent location information for user review. At location 914 the vehicle will be in a tolling location defined by geofenced region 908, and a toll transaction can occur. The toll transaction involves the mobile device sending transaction information, including location information for location samples taken while in geofenced region 908, to a toll agency for processing. The toll agency can be a government agency that operates the tolling location, or a third party that interfaces with the government agency to pay tolls on behalf of subscribers using the tolling app.

At location 918 the vehicle will initially be outside of the geofenced region 906, but still not beyond the first distance threshold away from geofenced region 906. Thus, initially, the high sampling rate is maintained, but the rate of location information transmission is reduced in steps 608 or 708. When the vehicle gets far enough away from geofenced region 906 (and not with the first distance threshold of another geofenced region), then the location sampling rate will be reduced according to step 820. The geofenced regions 906, 908 are examples of basic geofenced regions that will be included in all sets of geofenced regions used by mobile devices running the tolling app.

Figure 10:
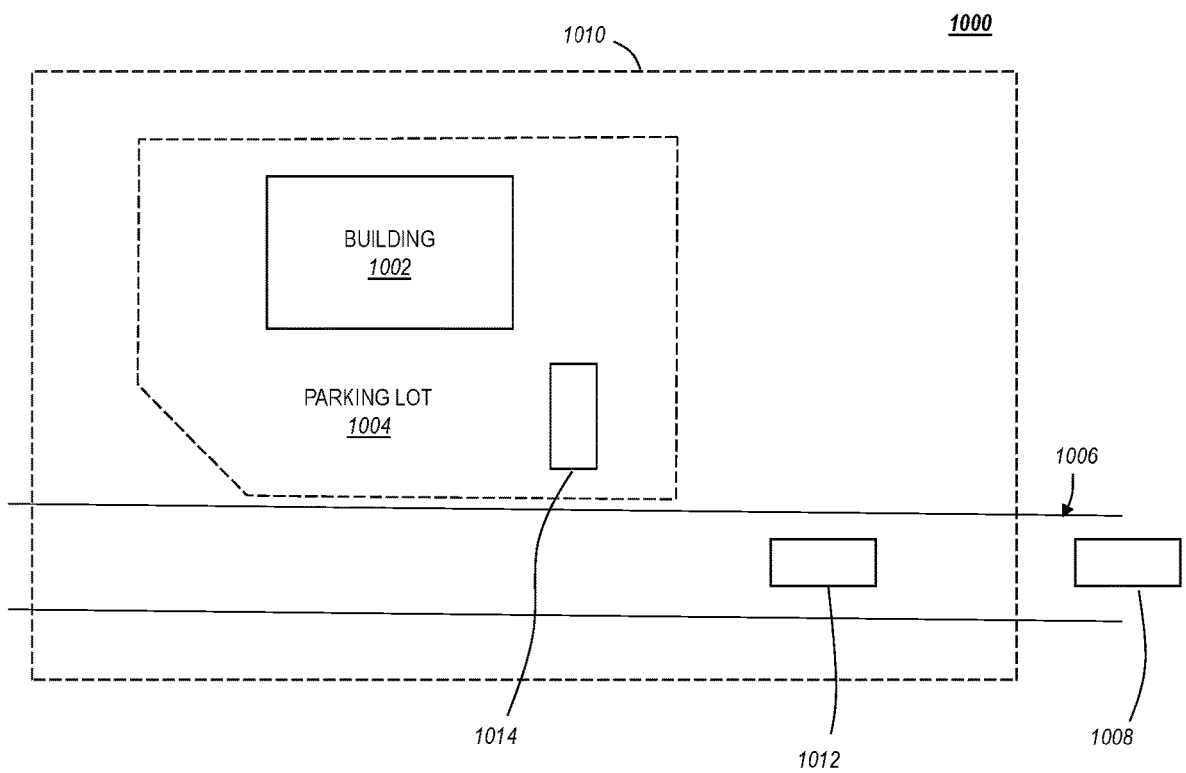
FIG. 10 is a location diagram including a user-defined geofenced region of the user's authorized geofenced regions, and showing the user in different locations relative to the geofenced regions to illustrate how location sampling and reporting is handled in each of the various locations, in accordance with some embodiments.

FIG. 10 is a location diagram 1000 including a user-defined geofenced region of the user's authorized geofenced regions, and showing the user in different locations relative to the geofenced regions to illustrate how location sampling and reporting is handled in each of the various locations, in accordance with some embodiments. Unlike geofenced regions 906, 908, geofenced region 1010 can be an optional geofenced regions, either one added by the user opting-in to a promotional program to offset toll charges, for example, using method 400, or by the user selecting the region as a specific region of interest to the user (e.g. using method 500). In the region 1010 can be a building 1002 that includes an associated parking lot 1004 that may be a defined geofenced region that is added when the user selects to include geofenced region 1010. The building 1002 can be a business that the user frequents, a medical care office, a pharmacy, or any other establishment that may be of interest. A roadway 1006 can pass through the geofenced region 1010, and a vehicle can drive on the roadway, passing through positions 1008, 1012. At position 1008, the vehicle is outside of the geofenced region 1010, but approaching region 1010. According, the app operates as it is described with respect to position 912 of FIG. 9. Initially the location sampling rate may be low, and then increased when the vehicle is within the first threshold distance from geofenced region 1010. Location reporting does not occur at location 1008, according to method 700. Once in geofenced region 1010, the increased sampling rate is maintained and location information is reported to the server. In response, the server can push a promotional notification to the mobile device for display to the user. The promotional notification can indicate a sale, or a reminder that the user has business at the building (e.g. a reminder to pick up a prescription). The vehicle may drive into the parking lot and park at location 1014. Upon entering geofenced region 1004, a different promotional notification or other notification may be pushed to, or otherwise rendered for the user of the mobile device. Further, while parked, the mobile device will not be in motion, and, according to steps 616, 716 the mobile device will stop transmitting location information.

In some embodiments it is contemplated that a defined geofenced region such as region 1010 can be tied to a reminder system. Thus, when the vehicle enters geofenced region 1010, the app can issue a notification (e.g. play a sound, present a notification icon) to remind the user to pick up a prescription, for example. In another example, the geofenced region 1004 can be a return lot of a car rental agency. The geofence definition for region 1004 can include a hyperlink to the car rental agency's server to complete a return process. Thus, upon entering region 1010, the user may be prompted to indicate whether they intend to return a vehicle, and upon entering region 1004 the return process can be automatically completed.

Figure 11:
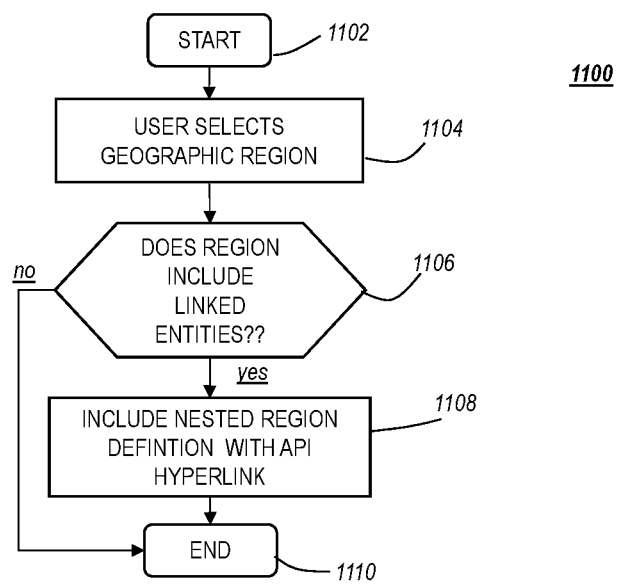
FIG. 11 is a flow chart diagram of a method for adding a nested geofenced location into a user selection of a larger geofenced region, in accordance with some embodiments.

FIG. 11 is a flow chart diagram of a method 1100 for adding a nested geofenced location into a user selection of a larger geofenced region, in accordance with some embodiments. The method 1100 can work in conjunction with method 500, and at the start 1102 the user can enter method 500 to select a region on a map interface in step 1104 (corresponding to step 508). In step 1106 the region selected by the user can be examined by the app or server to determine if there are any pre-defined geofenced regions in the larger selected region. Any such pre-defined geofenced regions can be for businesses or other entities, and there can be an associated hyperlink to a URL or API, or some other link to either another app on the mobile device or to a website or other network-linked resource. When the user selects a region, then, the user can optionally accept or include any smaller pre-defined regions for including in the set of user-authorized geofenced regions. Likewise, regions included when the user opts-in to the receiving additional geofenced regions, as in method 400, the additional geofenced regions included with the base set of geofenced regions can include an associated hyperlink related to a business or other entity in that geofenced region. In step 1108 any defined regions within a user selected region causes the server to transmit definitions for those regions to the mobile device for inclusion in the set of user authorized geofenced regions. For example, a user can selected region 1010 in FIG. 10, and region 1004 can be automatically added as being within region 1010. The method can then end in step 1110.

Figure 12:
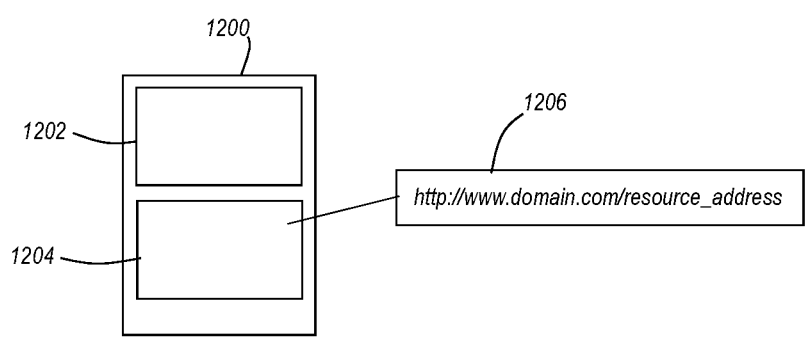
FIG. 12 is an abstraction of a geofenced region definition for a business, where the definition includes a hyperlink to a computing resource of the business for processing by a third party application or a browser of the mobile device, in accordance with some embodiments.

FIG. 12 is an abstraction of a geofenced region definition 1200 for a business, where the definition includes a hyperlink 1206 to a computing resource of the business for processing by a third party application or a browser of the mobile device, in accordance with some embodiments. The definition 1200 can include geographic data 1202 defining the geographic boundaries of the geofenced region, and the link 1206 can be included in a field in associated data 1204. The definition 1200 can be included in a set of user authorized geofenced regions.

Figure 13:
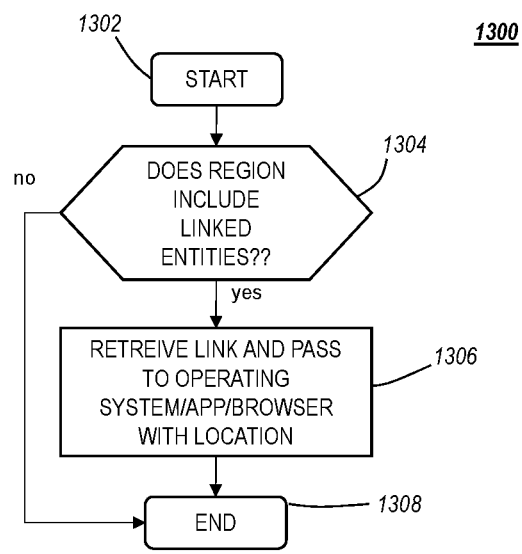
FIG. 13 is a flow chart of a method for processing a hyperlink associated with a geofenced region upon entering a region corresponding to the geofenced region, in accordance with some embodiments.

FIG. 13 is a flow chart of a method 1300 for processing a hyperlink associated with a geofenced region upon entering a region corresponding to the geofenced region, in accordance with some embodiments. At the start 1302 the mobile device can be performing method 600 or method 700 in determining whether the mobile device is within any geographic area corresponding to one of the definitions in the set of user authorized geofence region definitions. Once it is determined that the present location of the mobile device is within a region corresponding to one of the definitions, it is determined in step 1304 whether there is a link associated with the region. If so, then in step 1306 the link is retrieved from the definition file (e.g. 1206) and passed to the operating system, or another app on the mobile device, or a browser on the mobile device. Thus, for example, definition 1200 can be associated with car rental return location. Upon the mobile device determining that its present location is within the region defined by the boundary information 1202, the link can be retrieved in step 1306 and passed to an app associated with the car rental agency, or used to access the resource directly and provide some information to complete a transaction such as a car rental return. Then in step 1308 the method ends.

Figure 14:
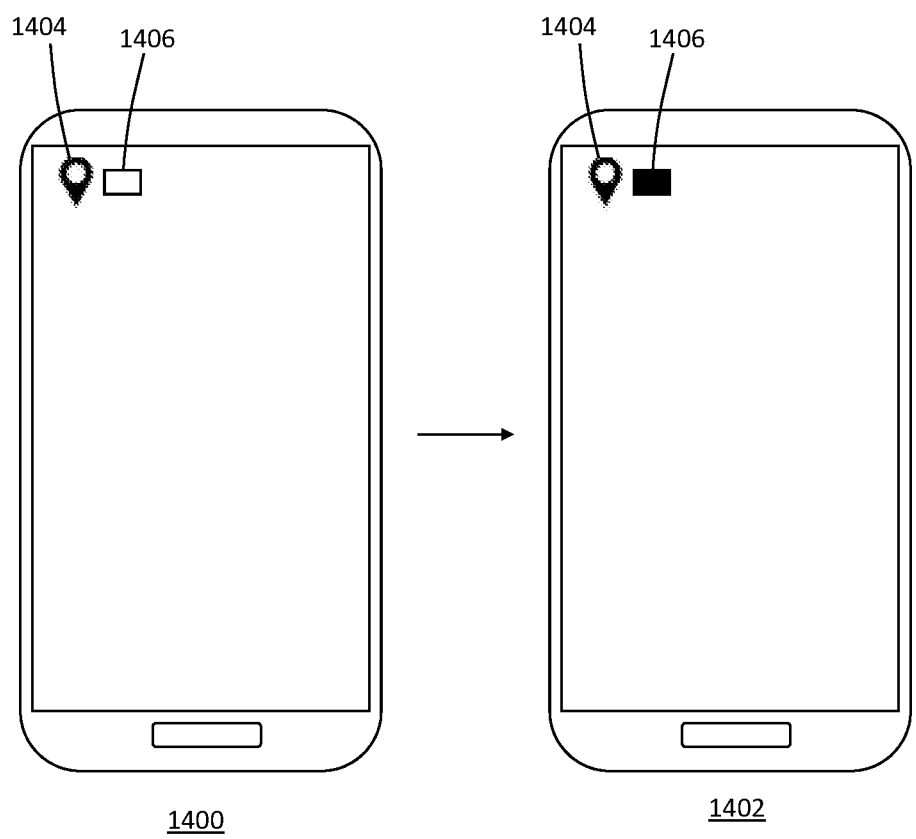
FIG. 14 shows an icon sequence diagram for a mobile device passing from outside a geofenced region to inside a geofenced region, in accordance with some embodiments.

FIG. 14 shows an icon sequence diagram for a mobile device passing from outside a geofenced region 1400 to inside a geofenced region 1402, in accordance with some embodiments. The mobile device has a screen on which a location icon 1404 is shown by the mobile device's operating system any time an application, including a tolling application, access the satellite location receiver to receive location data. Manufacturers of mobile devices provide the location icon 1404 to inform users that location is being monitored. The location icon 1404 can be changed based on the level of location accuracy being requested by a given application. Generally there are at least two levels of location precision. In addition, the tolling application displays a secondary icon 1406 that is changed between a first graphical state and a second graphical state based on whether the tolling application is sending or not sending location data. As described, when using the base location sampling rate, the mobile device does not report or transmit location information. Thus, in state 1400, the tolling application is receiving general location information and the mobile device is outside of defined geofenced tolling regions using the base location sampling rate. In state 1402 the mobile device has entered a geofenced tolling region, and as a result, it is using the higher location sampling rate and transmitting location data. The location icon 1404 may change accordingly, as well. Thus, the user is informed that, even though the tolling application is obtaining location information outside of the geofenced tolling regions, that location information is not transmitted outside of the mobile device. This assures user's that their location is only transmitted when necessary, when the mobile device is inside of a geofenced toll region.

As disclosed herein, the inventive embodiments provide for a method and system in which location reporting and location sampling minimizes disclosure of personal information and reduces the load on the battery of the mobile device. The user of the mobile device can select only a base set of geofenced region definitions, an expanded set that are used for promotional purposes, and the user can add their own geofenced region definitions corresponding to regions of interest to the user. Operation of the mobile device's location sampling rate and what location information is shared by the mobile device is therefore dynamic, and under control of the user by settings of the device.

What is claimed is:

1. A mobile device, comprising:
a processor;
a non-volatile storage coupled to the processor including instruction code that, upon execution by the processor, causes the mobile device to:
generate a set of user-authorized geofenced region definitions and storing the set of user authorized geofenced region definitions in the mobile device, wherein to generate the set of user-authorized geofenced region definitions, the instruction code further causes the mobile device to:
receive a base set of geofenced region definitions over a network from a backend server;
prompt a user of the mobile to indicate whether the user wants to opt-in to an expanded set of geofenced region definitions; and
receive the expanded set of geofenced region definitions over the network from the backend server and including the expanded set of geofenced region definitions with the of geofenced region definitions in the set of user-authorized geofence definitions;
determine its present location periodically at a base location sampling rate;
compare the present location with the set of user-authorized geofenced region definitions; and
determine that the present location is within a threshold distance from at least one geofenced region corresponding to one of the geofenced region definitions in the set of user-authorized geofenced region definitions, and in response, the mobile device increasing determining its present location to a high location sampling rate that is higher than the base location sampling rate.

2. The mobile device of claim 1, wherein the instruction code further causes the mobile device to:
not transmit location information while determining its present location periodically at the base location sampling rate; and
determine that the present location is within at least one geofenced region corresponding to one of the geofenced region definitions in the set of user-authorized geofenced region definitions, and in response, the mobile device periodically transmits the location information to a backend server over a network.

3. The mobile device of claim 2, wherein the instruction code further causes the mobile device to:
subsequent to determining that the present location is within the at least one geofenced region, determine, based on consecutive location determinations, that the mobile device is not moving; and
in response to determining that the mobile device is not moving, inhibit transmitting the location information while the mobile device is not moving.

4. The mobile device of claim 1, wherein the base location sampling rate and the high location sampling rate are determined in terms of distance and based on a present speed of the mobile device.

5. The mobile device of claim 4, wherein the base location sampling rate is adjusted so that location sampling occurs once per kilometer.

6. The mobile device of claim 4, wherein the high location sampling rate is adjusted such that location sampling occurs once every five meters.

7. The mobile device of claim 1, wherein the instruction code further causes the mobile device to:
determine that the present location is within at least one geofenced region corresponding to one of the geofenced region definitions in the set of user-authorized geofenced region definitions, and in response determine that the one of the geofenced region definitions includes a resource link;
utilize the resource link to access a resource corresponding to the resource link; and
notify a user of the mobile device of the resource.

8. The mobile device of claim 1, wherein each of the geofenced region definitions in the base set of geofenced region definitions correspond to a tolling location.

9. The mobile device of claim 1, wherein the instruction code further causes the mobile device to:

display an icon in a first graphical state when using the base location sampling rate; and display the icon in a second graphical state when using the high location sampling rate.

\* \* \* \* \*